US008949952B2

(12) United States Patent
Dec et al.

(10) Patent No.: US 8,949,952 B2
(45) Date of Patent: Feb. 3, 2015

(54) MULTI-STACK SUBSCRIBER SIGN ON

(75) Inventors: Wojciech Dec, Amsterdam (NL); Piyush Agarwal, Sunnyvale, CA (US); Jean-Philippe Champagne, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/455,767

(22) Filed: Apr. 25, 2012

(65) Prior Publication Data
US 2013/0291073 A1 Oct. 31, 2013

(51) Int. Cl.
*H04L 29/06* (2006.01)

(52) U.S. Cl.
USPC .................. 726/5; 726/3; 726/11; 726/12

(58) Field of Classification Search
CPC ....................................... G06F 17/30
USPC .............................. 726/5, 3, 11, 12
See application file for complete search history.

(56) References Cited

U.S. PATENT DOCUMENTS

| 7,216,236 B2 * | 5/2007 | Kou et al. ................ 713/183 |
| 7,734,027 B2 * | 6/2010 | Cai et al. ................ 379/142.06 |
| 8,151,325 B1 * | 4/2012 | Bennett et al. .............. 726/4 |
| 8,484,715 B2 * | 7/2013 | Liang ...................... 726/11 |
| 2005/0160183 A1 * | 7/2005 | Valli et al. ................. 709/245 |
| 2009/0055912 A1 * | 2/2009 | Choi et al. .................. 726/6 |
| 2009/0300739 A1 * | 12/2009 | Nice et al. ................... 726/6 |
| 2011/0106947 A1 * | 5/2011 | Lin ........................ 709/225 |
| 2011/0173683 A1 * | 7/2011 | Roach ....................... 726/4 |
| 2012/0207168 A1 * | 8/2012 | Lahlou et al. ............. 370/392 |
| 2012/0284786 A1 * | 11/2012 | Somani et al. .............. 726/7 |
| 2013/0086634 A1 * | 4/2013 | Dee et al. ................... 726/3 |
| 2013/0254423 A1 * | 9/2013 | George, IV ............... 709/238 |

OTHER PUBLICATIONS

Robert J. Shimonski, The Best Damn Firewall Book Period, ISBN:1931836906 9780080556871, Published 2007, ACM.*
Wang Zhen-Xing, High-performance IPv4/IPv6 Dual-stack Routing Lookup, Publication Year: 2004 , pp. 476-481 vol. 1, IEEE.*
Jdoyle, "The Dual Stack Dilemma", Jun. 4, 2009, NetworkWorld.com Community, http://www.networkworld.com/community/node/42436.

* cited by examiner

*Primary Examiner* — Bradley Holder
*Assistant Examiner* — Gita Faramarzi
(74) *Attorney, Agent, or Firm* — Brinks Gilson & Lione

(57) ABSTRACT

A system includes a multi-stack subscriber, a gateway, and a web portal. The web portal determines whether the subscriber is authenticated to access the Internet using a first Internet Protocol by receiving logon information from the subscriber. The subscriber requests to access the Internet using a second Internet Protocol. The gateway and/or the web portal determine whether the subscriber is authenticated to access the Internet using the second Internet Protocol without sending a second logon to the subscriber.

15 Claims, 6 Drawing Sheets

MULTI-STACK SUBSCRIBER SIGN ON

FIELD

The present embodiments relate to authenticating a subscriber and, more particularly, to authenticating a subscriber that runs on a multi-stack using a single logon.

BACKGROUND

In some environments, an Internet subscriber may first need to be authenticated before being granted access to the Internet. To become authenticated, the subscriber may be provided with a request to provide a logon, such as a username and password. If the logon provided by the subscriber is valid, then the subscriber may be granted access to the Internet.

DETAILED DESCRIPTION

Overview

An apparatus includes a memory; and at least one processor in communication with the memory. The at least one processor is configured to store a first subscriber identification in the memory. The subscriber identification is stored in response to a determination that the subscriber is authenticated to access the Internet using a first Internet Protocol. The at least one processor is also configured to receive a request to access the Internet made by the subscriber using a second Internet Protocol. The request includes a second subscriber identification. In addition, the at least one processor is configured to compare the second subscriber identification with the first subscriber identification; and determine whether the subscriber is authenticated to access the Internet using the second Internet Protocol. The determination is based on the comparison.

Description of Example Embodiments

The present disclosure describes a system that authenticates a subscriber configured to communicate with and/or over the Internet using two or more Internet Layer protocols with a single logon provided by the subscriber. In the system, the subscriber may be authenticated to connect to and/or communicate with the Internet using a multi-stack, such as a dual stack (e.g., using both a first Internet Layer protocol and a second Internet Layer protocol) without providing multiple logons. The multiple Internet Layer protocols may include Internet Protocol (IP) version 4 (IPv4) and IP version 6 (IPv6), as examples.

Figure 1:
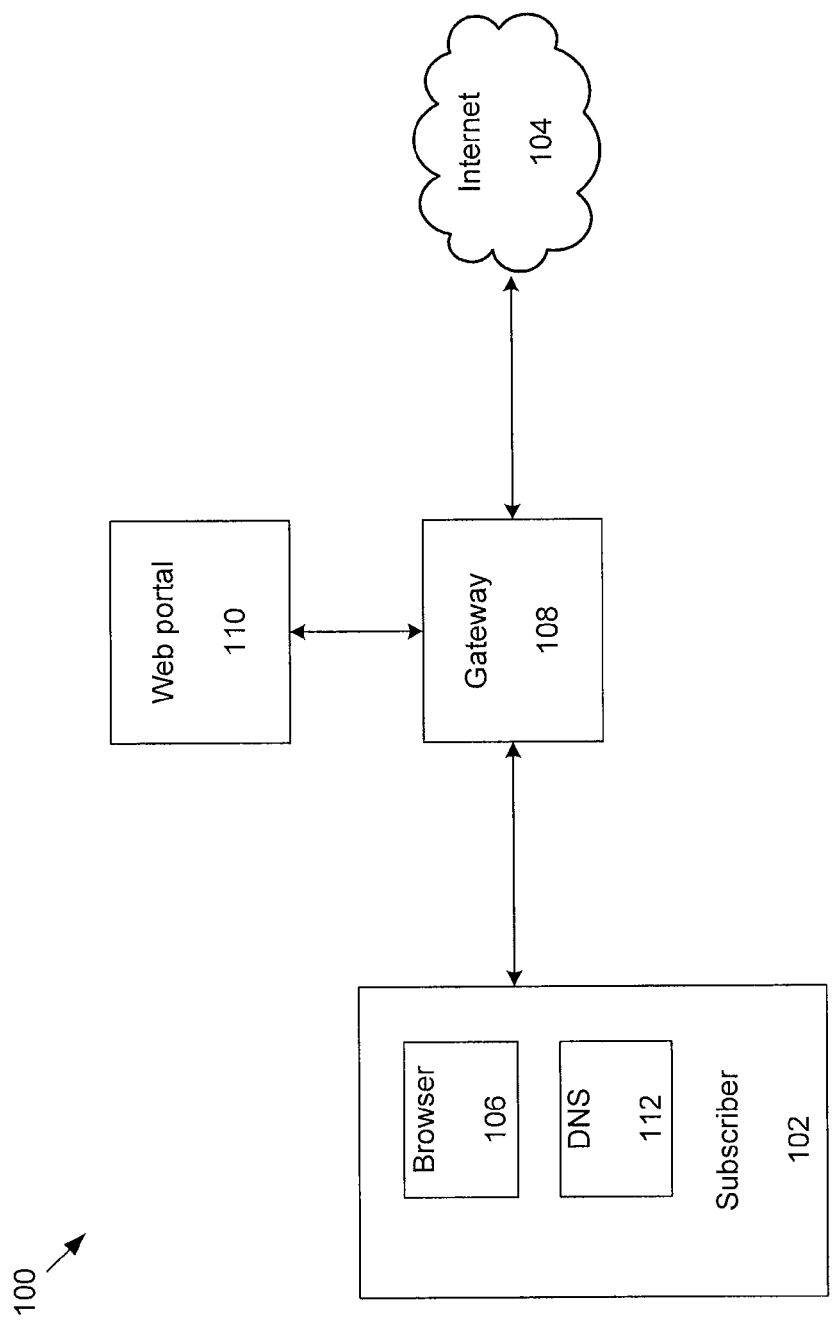
FIG. 1 illustrates an example system that may be used to authenticate a subscriber for multiple IP protocols with a single logon.

FIG. 1 shows an example system 100 that may be configured to authenticate a subscriber 102 that is configured to access the Internet 104 using two or more IP protocols. The system 100 may include a subscriber 102. The subscriber 102 may be, may include, or may be part of an electronic device, apparatus, or system that is configured to connect to and/or communicate over the Internet 104. The subscriber 102 may be or may include some or all of the components of the computer system 600 shown in FIG. 6. In addition or alternatively, the subscriber 102 may include multiple electronic devices, apparatuses, or systems, each including one or more computer systems 600. In some configurations, the subscriber 102 may include one or more clients, each client being configured and/or able to connect to and/or communicate with the Internet 104. Each client may be or may include the computer system 600 shown in FIG. 6.

The subscriber 102 may have two or more identifications (IDs), each being associated with one of the Internet Layer protocols (also referred to as IP protocols). For example, the subscriber 102 may have a first ID associated with a first IP protocol and a second ID associated with the second IP protocol. The first ID associated with the first IP protocol may be a different address and/or may be in a different format than the second ID associated with the second IP protocol. The IDs associated with the first and second IP protocols may be Layer 3 IDs that identify and/or are used to identify the subscriber 102 on Layer 3 (i.e., the Network Layer) of the Open Systems Interconnection (OSI) model. The Layer 3 IDs may be IP addresses. In some examples, the subscriber 102 may be, may include, or may be part of a subnet. A subnet may include a plurality of clients having at least a portion of a layer 3 ID in common. The Layer 3 IDs may be differentiated from a Layer 2 ID, which may identify the subscriber 102 on Layer 2 (i.e., the Data link Layer) of the OSI model. For example, a Layer 2 ID may be a media access control (MAC) address, whereas a Layer 3 ID may be an IP address.

Once connected to the Internet 104, the subscriber 102 may request and receive information, such as web content, from the Internet 104. In response, the subscriber 102 may receive the requested information. The requested information may be provided in various formats, such as hypertext markup language (html), as an example. The subscriber 102 may include a web browser 106 that may be configured to send the request for information and/or receive the information. The web browser 106 may be stored, executed, and/or operated using a computer system, such as the computer system 600 shown in FIG. 6. The web browser 106 may also be able to receive the request, such as by being in communication with an input device, such as an input device 612 of the computer system 600 shown in FIG. 6. In addition, the browser 106 may be configured to receive the requested information and display the information, such as a website, webpage, image, as examples. The requests and responses may be communicated in various formats or syntaxes and using various protocols. For example, the browser 106 may receive the request as a uniform resource locator (URL). The URL may contain a scheme or a transfer protocol, such as hypertext transfer protocol (HTTP), and the browser 106 may send the request in accordance with the identified scheme or protocol. For example, the browser 106 may send a HTTP request. In response, a host or server having the requested information may send a response back in accordance with the scheme or protocol, such as HTTP. The response may include links to other information, such as other websites, webpages, or images, as examples. For example, the links may be embedded as a URL in a response in a hypertext markup language (HTML) format. After receiving the response, the subscriber 102, including the browser 106, may make subsequent requests for information from the Internet 104. In some examples, the subsequent requests may be associated with the links received in the initial response.

The subscriber 102 may be configured to send the request in accordance with the first IP protocol or the second IP protocol. For example, when the subscriber 102 sends the request, the first ID associated with the first IP protocol or the second ID associated with the second IP protocol may be included in the request. The ID that is included may be chosen based on the IP protocol for which the requested information is accessible. For example, if the subscriber 102 wishes to access a webpage that is accessible via IPv4, then the subscriber 102 will include its IPv4 address when making the request. The IP address may be sent as a source address of the subscriber 102. By including the ID in the response, the address or location for where to send the response is known.

As previously described, the ID associated with the IP protocol are Layer 3 IDs and may be differentiated from Layer 2 IDs, such as MAC addresses. Layer 3 IDs may be used where the Layer 2 ID is no longer available to a recipient of the request. For example, the request may be sent from the subscriber 102 downstream and be received by an electronic device or apparatus, such as a router, that is configured to assist in connecting the subscriber 102 to the Internet 104 and/or send the requested information to the subscriber 102. When forwarding the request downstream, the electronic device or apparatus may remove the Layer 2 ID of the subscriber 102 and replace the Layer 2 ID with its own or another Layer 2 ID. After the Layer 2 ID of the subscriber 102 is removed and/or replaced, the subscriber's Layer 2 ID may be no longer identified by electronic devices or apparatuses in the system. The Layer 3 ID may be used to determine where to send the response to the requested information because the Layer 2 ID of the subscriber 102 is no longer available.

To access the Internet 104, the subscriber 102 may be configured to communicate with and/or through a gateway 108. The gateway 108 may be configured to provide and/or determine to provide the subscriber 102 access and/or grant approval to the subscriber 102 to connect to the Internet 104. Without approval or authentication from the gateway 108, the subscriber 102 may not connect to and/or receive information from the Internet 104. In addition, the gateway 108 may be configured to manage a connection and/or communication between the subscriber 102 and the Internet 104 in other ways, such as by managing bandwidth restrictions; quality of service (QoS) parameters; accounting, such as tracking any charges, fees, or costs that the subscriber 102 may incur by connecting to the Internet 104; and/or security parameters, as examples.

Figure 6:
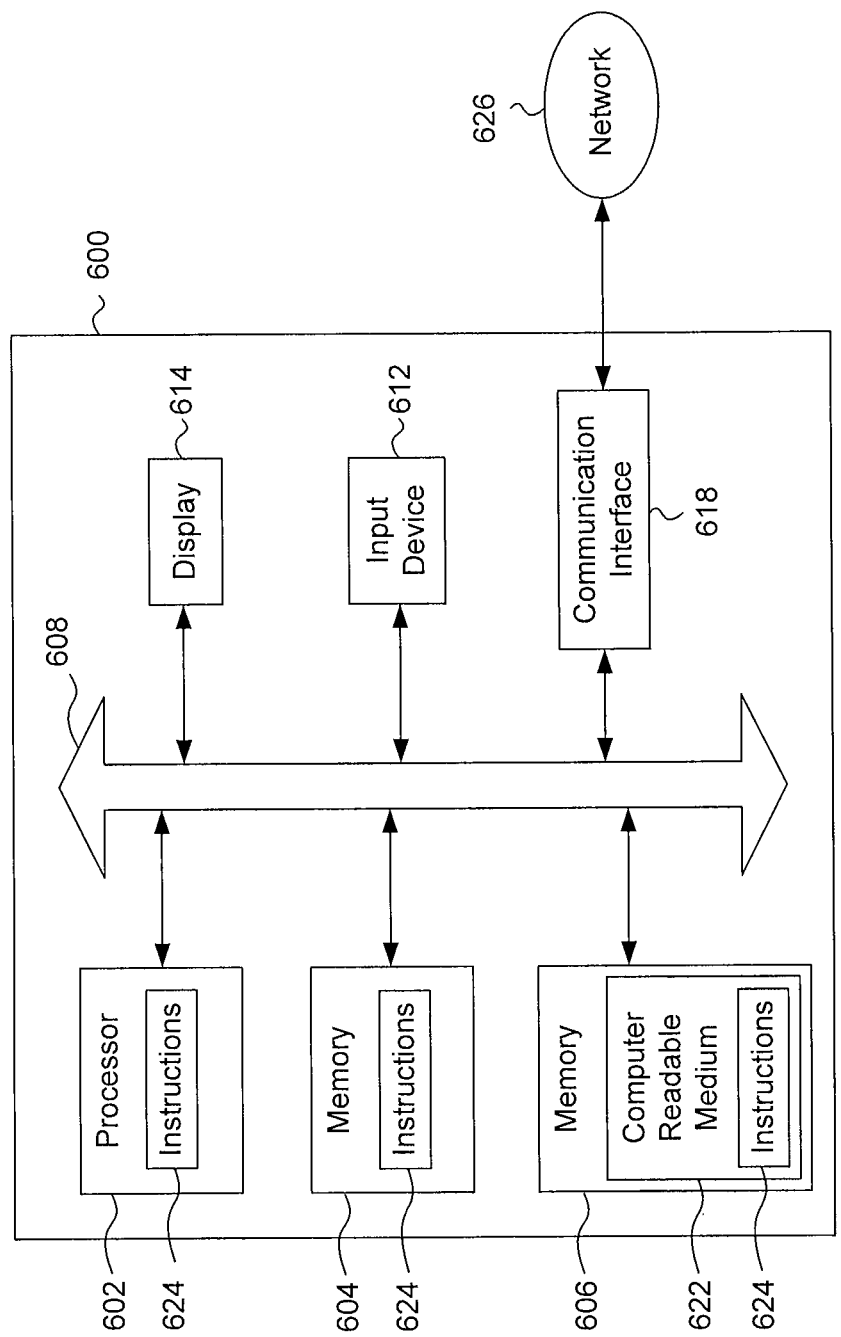
FIG. 6 is an example of a computer system that may be used for one or more components in the example system.

The gateway 108 may be, may include, or may be part of an electronic device, apparatus, or system that is or includes some or all of the components of the computer system 600 shown in FIG. 6. In one example, the gateway 108 may be, or may be a component of, a router. The gateway 108 may be an electronic device, apparatus, or system that is separate from the subscriber 102. The gateway 108 may be connected to and/or configured to communicate with the subscriber 102 through a wired or wireless, such as through an Ethernet, WiFi, or Bluetooth connection, as examples. The gateway 108 and the subscriber 102 may communicate through communication interfaces, such as the communication interface 618 of the computer system 600 shown in FIG. 6. In addition, one or more routers, switches, or bridges may be connected in between the subscriber 102 and the gateway 108 that forward and/or route the subscriber's 102 request to the gateway 108. In alternative configurations, the gateway 108 and the subscriber 102 may be part of the same computer system, such as the computer system 600 shown in FIG. 6.

When the subscriber 102 sends a request to access the Internet 104, the request may be received by the gateway 108. In one example, the request may be sent upon activation and/or startup of the browser 106. Alternatively, the request may be an initial request for information, such as an initial request to access a webpage or a website from the Internet 104. Upon receipt of the request, the gateway 108 may determine whether the subscriber 102 is authenticated to receive the requested information.

The gateway 108 may determine whether the subscriber 102 is authenticated by determining whether the Layer 3 ID associated with the first or second IP protocol is known to the gateway 108. If the ID is known, then the gateway 108 may pass the request over the Internet 104 toward its intended destination. Alternatively, if the ID is not known to the gateway 108, then the gateway 108 may send and/or redirect the request to a web portal 110. The gateway 108 may send and/or redirect the request to the web portal 110 to authenticate the subscriber 102.

The web portal 110 may be configured to set and/or determine one or more connection parameters, such as determine whether the subscriber 102 is authenticated; determine bandwidth restrictions; determine quality of service (QoS) parameters; determine accounting parameters, which may include tracking charges, fees, or costs that the subscriber 102 may incur by connecting to the Internet 104; and/or determine security parameters for the subscriber 102, as examples. The web portal 110 may communicate the connection parameters to the gateway 108, and the gateway 108 may use the received connection parameters when managing the connection between the subscriber 102 and the Internet 104. For example, the web portal 110 may be in a location that is remote from the subscriber 102 and/or the web portal 110. In one example, the web portal 110 may be owned, operated, and/or controlled by an Internet Service Provider (ISP) that provides Internet 104 access to the subscriber 102. The web portal 110 may be or may be part of an electronic device, apparatus, or system that is or includes a computer system, such as the computer system 600 shown in FIG. 6. In one example, the web portal 110 may be or may be included as part of a server. The web portal 110 may be a component of the system 100 that is separate from the subscriber 102 and/or the web portal 110. In addition, the web portal 110 and the gateway 108 may communicate using a wired connection, a wireless connection, or a combination thereof. The web portal may communicate using a communication interface, such as the communication interface 618 of the computer system 600, shown in FIG. 6.

The web portal 110 may receive the request to access the Internet 104. In response to receiving the request, the web portal 110 may provide a logon request to the subscriber 102 via the gateway 108. In response to receiving the logon request, the subscriber 102 may be configured to send a logon response to the web portal 110. In one example configuration, the browser 106 of the subscriber 102 may display the logon request to a user of the subscriber 102. The displayed logon request may prompt the user for logon information, such as a username and password. The browser 106 may receive the logon information, such as through an input device of a computer system, such as the input device 612 of the computer system 600 shown in FIG. 6. In other configurations, the browser 106 may be configured to automatically know the logon information without receiving the information from the user and/or the input device.

The browser 106 may be configured to send the logon information to the web portal 110 via the gateway 108. The web portal 110 may be configured to receive the logon information and determine whether to authenticate the subscriber 102 based on the logon information. If the web portal 110 determines to authenticate the subscriber 102, then the subscriber 102 may be authenticated and connect to and/or receive information from the Internet 104. Alternatively, if the web portal 110 determines not to authenticate the subscriber 102, then the subscriber 102 may not be connected to and/or receive information from the Internet 104.

The web portal 110 may also be configured to send a message back to the subscriber 102 that the logon was successful or not, depending on the web portal's 110 determination. In one example, the message may be in webpage (such as html) format, although other formats may be used. Because the subscriber 102 is now authenticated, the gateway 108 may provide and/or grant access to the Internet 104 to the subscriber 102, such as by providing the subscriber 102 with a homepage or a start page through which the subscriber 102 may then access and/or receive information from the Internet 104.

The subscriber 102 may request to connect to the Internet 104 in accordance with and/or using one of the IP protocols, e.g., IPv4 or IPv6. In response to the request, a logon request and/or activation link may be provided to the subscriber 102 for the IP protocol for which the connection request was sent. After the logon is granted, the gateway 108 may be configured to know the ID (e.g., the IP address) of the subscriber 102 that is associated with the IP protocol that was used when sending the request. Thereafter, the subscriber 102 may receive information, such as website or webpages, that is accessible via that IP protocol.

To illustrate, the subscriber 102 may send a request to connect to the Internet 104 using IPv4. In response, the web portal 110 may provide a logon request to the subscriber 102. If the logon response is accepted by the web portal 110, then the subscriber 102 may be authenticated to connect to the Internet 104 using IPv4. The gateway 108 knows the ID of the subscriber 102 associated with IPv4 (e.g., the IPv4 address) and permits the subscriber 102 to receive web content from the Internet 104 that is accessible via IPv4.

As previously described, the subscriber 102 may be configured to have multiple stacks (e.g., a dual stack) and communicate over the Internet 104 using two or more different IP protocols, e.g., IPv4 and IPv6. When the subscriber 102 is authenticated to receive information from over the Internet 104 using one IP protocol, the subscriber 102 is not automatically authenticated to communicate over the Internet 104 using the other IP protocol. In some situations, the subscriber 102, after being authenticated to communicate over the Internet 104 using one of the IP protocols, may request information, such as a webpage or a website, that is accessible via another IP protocol. If the subscriber 102 requests information that is accessible via another IP protocol, the request is made using the other IP protocol. For example, the request includes the ID (e.g., the IP address) that is associated with the other IP protocol. The gateway 108 receives the request, determines that the ID associated with the IP protocol is not known (because the subscriber 102 knows and is authenticated for only the first IP protocol), and sends and/or redirects the request to the web portal 110 for authentication. In prior configurations, the web portal 110, in response to receiving the request, may provide a second logon request to the subscriber 102. The subscriber 102, such as through the browser 106, may send a second logon response with second logon information back to the web portal 110 for authentication. If second logon information is accepted by the web portal 110, then the subscriber 102 maybe authenticated to access the Internet 104 using the other IP protocol.

The present disclosure describes various configurations and/or ways to authenticate the subscriber 102 for more than one IP protocol, where the authentication is performed using a single logon provided by the subscriber 102. The various ways or configurations may enable the subscriber 102 to be authenticated to access the Internet 104 using multiple IP protocols without having to provide more than one logon.

In a first example configuration, after the web portal 110 determines to accept the logon provided by the subscriber 102, the web portal 110 may be configured to send a link to access the Internet 104 via an IP protocol that is different from the IP protocol that was used by the subscriber 102 to initially request to access the Internet 104. The link may be included in or as part of a message sent to the subscriber 102 that indicates that the subscriber 102 is authenticated to access the Internet 104 using the first IP protocol. To illustrate, the subscriber 102 may send a request to access the Internet 104 using IPv4. The request may be redirected from the gateway 108 to the web portal 110 for authentication, in which the web portal 110 may provide the subscriber 102 with a logon request. If the web portal 110 receives a valid logon response from the subscriber 102, then the web portal 110 may provide a message to the subscriber 102, via the gateway 108, that includes a link to access the Internet 104 via a different IP protocol, such as IPv6.

The browser 106 may be configured to receive the message. In some configurations, the browser 106 may also be configured to display the message, for example by outputting the message to a display unit of a computer system, such as the display unit 610 of the computer system 600 shown in FIG. 6. The browser 106 may be configured to activate the link. In one example, the browser 106 may be configured to automatically activate the link in response to receiving the message. In an alternative example, the browser 106 may be configured to activate the link based on receiving a response, such as a response received through an input device of a computer system, such as the input device 612 of the computer system 600, shown in FIG. 6.

Upon activation, the browser 106 may be configured to generate a second request to access the Internet 104. The second request may be made using an IP protocol that is different than the IP protocol used to initially request to access the Internet 104. Due to the configuration of the message, and/or the link included in the message sent from the web portal 110, the gateway 108 may be configured to know that the subscriber 102 is authenticated to access the Internet 104 even though the second access request is sent using a different IP protocol.

In more detail, the link may include information that, when the link is activated, causes and/or forces the subscriber 102 to send the request using the other IP protocol. The link may also include a subscriber ID that identifies the subscriber 102 for both of the IP protocols. The subscriber ID may be unassociated with either IP protocol. The subscriber ID may provide an identification for the subscriber 102 that is additional to the ID associated with the first IP protocol and the ID associated with the second IP protocol. The subscriber ID may uniquely identify the subscriber 102, and/or differentiate or distinguish the subscriber 102 from other subscribers (not shown). In addition, the subscriber ID may be the same for when the request to access the Internet 104 is sent using either one of the IP protocols or the other IP protocol. As an example, where the first and second IP protocols are IPv4 and IPv6, the subscriber 102 may have an IPv4 address and an IPv6 address. The subscriber 102 may also have and/or be given a subscriber ID, for example, "Bob." Whether the request to access the Internet 104 is made using the IPv4 address or using the IPv6 address, the subscriber ID is the same—"Bob."

The link may be sent from the web portal 110 to the gateway 108. The gateway 108 may record, such as store in memory, the subscriber ID included in the link. The gateway 108 may then send the link to the subscriber 102. Upon receiving the link, the subscriber 102 may be configured to activate the link. When the link is activated, the subscriber 102 may be configured to send a second request to access the Internet 104 to the gateway 108. In one example, the second request may include a request for information, such as a website, webpage, or image, as examples. The request for information may be a request from information from the web portal 110 and/or a server, such as a server located and providing information over the Internet. The second request may be sent using the other IP protocol. The other IP protocol may be used because information in the link caused and/or forced the subscriber 102 to send the second request using the other protocol.

The second request may include the subscriber ID. When the gateway 108 receives the second request, the gateway 108 may be configured to identify the subscriber ID included in the second request. The gateway 108 may further be configured to compare the subscriber ID included in the second request with the subscriber ID included in the link that the gateway 108 received from the web portal 110 and recorded. If the subscriber ID from the second request and the recorded subscriber ID from the link match, then the gateway 108 may be configured to determine that the subscriber 102 is authenticated to access the Internet 104. That is, by determining that the subscriber IDs match, the gateway 108 may determine that the subscriber 102 that sent the second request using the second IP protocol is the same subscriber 102 that sent the first request using the first IP protocol. Because the web portal 110 and/or the gateway 108 determined that the subscriber 102 was authenticated to access the Internet 104 through the logon from the first request, a second logon for the second IP protocol does not need to be sent to the subscriber 102. After the web portal 110 and/or the gateway 108 determines that the subscriber 102 sending the second request is authenticated, the gateway 108 may provide access to Internet content that is accessible via the second IP protocol to the subscriber 102. In one example, where the second request to access the Internet 104 includes a request for information, access to the Internet 104 may be provided by sending the requested information to the subscriber 102.

By sending a link that includes a subscriber ID, the gateway 108 may be configured to determine whether the subscriber 102 is authenticated without having to redirect the second request to the web portal 110 for a second logon and authentication. Without the subscriber ID, the gateway 108 may have redirected the second request to the web portal 110 because the ID associated with the other IP protocol would have been unknown to the gateway 108. By including the subscriber ID in the second request and having the subscriber ID be known to the gateway 108, the gateway 108 may determine that the subscriber 102 is authenticated without a second logon request being provided to the subscriber 102.

In one example, the link may be a URL link that is included in an html message. The information in the URL link that causes the subscriber 102 to send the second request using the other IP protocol may be a domain name and a resource, such as a webpage, that are accessible via the other IP protocol. In addition, the subscriber ID may be included as a query string. The query string may be included in the URL as a name/value pair. In addition, the URL may also include a port number of a destination port on which requested resource is provided. An example URL may be:

http://ipv4.portal.isp.com:8085/web-logon-successful-ipv4support.html?subscriber_id=Bob, where "ipv4.portal.isp.com" is the domain name, "web-logon-successful-ipv4support.html" is the resource (e.g., webpage), "subscriber_id=Bob" is the query string with "subscriber_id" being the name and "Bob" being the value of the query string, and 8085 is the port number. Other syntaxes or punctuation marks, including "http:" forward slashes ("/"), double slashes ("//"), question marks ("?"), and equal signs ("=") may be included as required by the URL format. Also, in the example URL above, the domain name "ipv4.portal.isp.com" may be used where the initial request to access the Internet 104 was sent by the subscriber 102 using a different IP protocol, such as IPv6. To cause the browser 106 to send the second request via IPv4, the web portal 110 is configured to include a domain name and resource (e.g., "ipv4.portal.isp.com" and "web-logon-successful-ipv4support.html") that are accessible via IPv4. Alternatively, if IPv4 is used in the first request, then the web portal 110 may be configured to include a domain name and resource that is accessible via the other IP protocol, or an IP protocol different than IPv4, such as IPv6. In the alternative example, the domain name may be "ipv6.portal.isp.com" and the resource may be "web-logon-successful-ipv6support.html," as examples. URLs other than the URL shown above may be used.

The URL link may be included in the html message and received by the subscriber 102. The browser 106 of the subscriber 102 may display the html message. The browser 106 may be configured to activate the link. In one example, the browser 106 may be configured to automatically activate the URL link upon receipt of the html message. For example, the html message may be include a URL link to information or web content, such as an image, that is to be displayed by the browser 106 as part of the html message. When the browser 106 receives the html message and displays the message, the browser may be configured to activate the URL link in order to display the content associated and/or retrievable through activiation of the link. Alternatively, the URL link may be activated by receiving an input from an input device of a computer system, such as the input device 612 of the computer system 600 shown in FIG. 6. To illustrate, the browser 106 may display the html message, which includes information associated with a URL link. The information may be a message that prompts an operator or user of the browser 106 to send an input signal through the input device of the computer system, which causes the web browser 106 to activate the link. Various configurations are possible to cause the browser 106 to activate the link.

Upon activation of the link, the browser 106 may be configured to generate the second request, which may be a request to access the webpage, "web-logon-successful-ipv4support.html," from over the Internet 104. Because the webpage is accessible via the other IP protocol, as previously explained, the browser 106 is configured to send a second request after the link is activated using the other IP protocol. The subscriber ID included in the query string may be included in the second request. The ID associated with the other IP protocol may also be included in the second request. The other IP address may be included as a source address of the subscriber 102.

The second request generated by activation of the URL link may be sent to the gateway 108. The gateway 108 may be configured to analyze the second request and determine the subscriber ID included in the second request. The gateway 108 may further be configured to compare the subscriber ID included in second request with the subscriber ID from the link received from web portal 110 that the gateway 108 stored. If the gateway 108 determines that the subscriber IDs match, then the gateway 108 may be configured to determine that the subscriber 102 is authenticated and send the requested webpage, "web-logon-successful-ipv4support.html," to the subscriber 102. After determining that the subscriber 102 is authenticated for both of the IP protocols, the gateway 108 may be configured to receive subsequent requests to access the Internet 104, such as subsequent requests for information from over the Internet 104, from the subscriber 102 without having to communicate with the web portal 110 to determine whether the subscriber 102 is authenticated.

In addition, the gateway 108 may be configured to record, such as by storing in memory, the port number included in the URL link received from the web portal 110. When the subscriber 102 generates the second request upon activation of the link, the subscriber 102 may be configured to include the port number included in the URL link. In one example, the subscriber 102 may be configured to include the port number as part of a destination address, which may also include a destination IP address, as described in more detail below. Upon receipt of the second request, the gateway 108 may be configured to identify the port number. The gateway 108 may also be configured to compare the port number included in the second request with the port number included in the link from the web portal 110 and that the gateway 108 recorded. If the port numbers match, then the gateway 108 may be configured to analyze the subscriber ID in the received second request. Alternatively, if the port numbers do not match, then the gateway 108 may be configured to take action, such as forwarding the second request in accordance with address information included in the second request, without analyzing the second request for a subscriber ID.

The gateway 108 may be configured to compare the port numbers before analyzing the subscriber IDs to efficiently handle the second requests. For example, the gateway 108 may be configured to receive multiple requests from the subscriber 102 and/or one or more requests from multiple subscribers, including the subscriber 102 and one or more other subscribers (not shown). It may not be necessary for the gateway 108 to analyze the subscriber IDs for every request that is received. For example, the subscriber 102 may not analyze the request for a subscriber ID if the subscriber 102 is sending the first request, if the subscriber 102 is sending a request after already being authenticated, or if another subscriber 102 is sending a request. In these situations, the request may not include a subscriber ID. In addition or alternatively, the gateway 108 may not need to analyze the subscriber ID in order to forward the request to the appropriate destination or determine if the sender of the request is authenticated, as examples. To avoid analyzing requests for subscriber IDs where the analysis is not necessary, the gateway 108 may be configured to analyze the subscriber IDs of the received requests for only those requests that are received on port numbers that were recorded. In doing so, the gateway 108 may be configured to differentiate the requests for which the gateway 108 is configured to analyze the subscriber ID and the requests for which the gateway 108 is configured not to analyze the subscriber ID. As a result, the amount of requests that the gateway 108 analyzes for subscriber IDs may be optimized and/or minimized. Other configurations may use different indicators other than the port number to distinguish the received requests.

In some configurations, the subscriber 102 may include and or be associated with a domain name system (DNS) 112 that is configured to translate and/or map a domain name to an associated or corresponding address, such a numerical address or an IP address. To illustrate, "ipv4.portal.isp.com" may be a domain name for a host that contains web content that is accessible via IPv4, as previously described. Before sending the second request, the subscriber 102, using the DNS 112, may be configured to translate the domain name to the associated IPv4 address before sending the request.

In order to perform the translation, the web portal 110 may provide the DNS 112, via the gateway 108, with a record that contains the translation information. Using the record, the DNS 112 may translate the domain name to a corresponding address. In one configuration, the DNS 112 may be configured to insert the corresponding address into the second request and send the second request toward the gateway 108. In other configurations, the DNS 112 may send the corresponding address back to the browser 106, and the browser 106 may be configured to send the second request. In one example, where the other IP protocol is IPv4, an A record (as defined in request for comment (RFC 1035) is provided from the web portal 110 to the subscriber 102. In another example, where the other IP protocol is IPv6, a quad-A (AAAA) record (as defined in RFC 3596) is provided from the web portal 110 to the subscriber 102. In some configurations, only the record associated with the other IP protocol (and not the record associated with the initial or first IP protocol) is provided to the DNS 112. For example, if IPv4 is used to send the first request to access the Internet 104, then a quad-A (AAAA) record for IPv6 is sent to the DNS 112. Similarly, if IPv6 is used to send the first request to access the Internet 104, then an A record for IPv4 is sent to the DNS 112.

The DNS 112 may be, may include, or may be part of a computer system, such as the computer system 600, shown in FIG. 6. Also, as shown in FIG. 1, the DNS 112 may be an integral component of the subscriber 102. For example, the DNS 112 may be included on the same computer system, such as the computer system 600, as the subscriber 102. Alternatively, the DNS 112 may be, may be included, or may be part of a computer system that is separate from subscriber 102. The DNS 112 may be referred to as the DNS 112 associated with the DNS, the subscriber DNS, and/or the client-side DNS, and may be distinguished and/or differentiated from a DNS associated with a host, the web portal 110, or a different system located across the Internet 104 and/or remotely from the subscriber 102. Various configurations are possible.

In some configurations, the subscriber 102 may be configured to send the second request as a packet. In addition or alternatively, the subscriber 102 may be configured to send the second request in accordance with a scheme or protocol identified in the link. An example scheme or protocol is HTTP, which may be identified in or as part of a URL link. For some schemes or protocols, such as HTTP, sending the second request in accordance with the scheme or protocol includes sending the second request as a packet, such as a HTTP packet. The packet may include a first portion that includes routing information, such as the source and destination addresses, and a second portion that includes one or more payloads or one or more data fields. In one example, the first portion may be a packet header. The routing information included in the packet header may include the ID associated with the first IP protocol or the ID associated with the second IP protocol. For example, the packet header may include an IP address associated with IPv4 or an IP address associated with IPv6. The second portion may include the subscriber ID. The second portion may also include the request for the information. For example, using the example URL above, the second portion may include the requested html page, web-logon-successful-ipv4support.html, and the query string, subscriber_id=Bob. Various configurations are possible.

Upon receipt of the packet, the gateway 108 may be configured to analyze the second portion (e.g., a data field) to identify the subscriber ID. A packet analysis that involves analyzing second portion or the data field may be referred as deep packet analysis. Deep packet analysis may be an analysis of the contents or data of the packet, such as the subscriber ID, that may be included in one or more fields or portions of the packet other than the header of the packet. By performing deep packet analysis, the gateway 108 may be configured to perform functions in addition to and/or that are more complex than typical routing functions. Typical routing functions may include analyzing the headers of the packets for address information in the headers and forwarding the packets in accordance with the address information. Typical routing functions may not include performing deep packet analysis.

As previously mentioned, the gateway 108 may be configured to analyze the port number included in the second request to determine whether to further analyze the second request for the subscriber ID. In an example configuration where the second request is sent as a packet, the port number may be included as part of the destination address included in the packet header, and the subscriber ID may be included in the data field. By analyzing the packet for the port number to determine whether to further analyze the packet for the subscriber ID, an analysis of the header of the received packet may be performed before a deep packet analysis is performed. As a result, the amount of deep packet analysis performed on received packets may be minimized and/or optimized.

In an alternative example configuration of the system 100, the web portal 110, rather than the gateway 108, may be configured to perform deep packet analysis on the second request. When the web portal 110 generates the link, the web portal 110 may be configured to record, such as by storing in memory, the subscriber ID. The web portal 110 may also record the port number included in the link. The web portal 110 may send the link to the subscriber 102, via the gateway 108, as previously described. Upon activating the link, the subscriber 102 may send the second request to the gateway 108 using the other IP protocol. The gateway 108 may receive the request and analyze the second request without performing a deep packet analysis. For example, the gateway 108 may analyze the header for an ID associated with an IP protocol, such as the IP address of the subscriber 102. If the address is unknown, then the gateway 108 may be configured to forward the second request to the web portal 110. The web portal 110 may be configured to identify the port number included in the second request. In one example, the port number may be included as part of the destination address included in a header of a packet, as previously described. The web portal 110 may further be configured to compare the port number with the port number that the web portal 110 included in the link. If the port numbers match, then the web portal 110 may be configured to identify the subscriber ID included in the second request. In one example, the subscriber ID may be included in a data field in the second request. The web portal 110 may be configured to perform a deep packet analysis to identify the subscriber ID. The web portal 110 may further be configured to compare the subscribe ID identified from the second request with the subscriber ID that the web portal 110 recorded. If the subscriber IDs match, then the web portal 110 may be configured to determine that the subscriber 102 is authenticated. That is, by determining that the subscriber IDs match, the web portal 110 may determine that the subscriber 102 that sent the second request using the second IP protocol is the same subscriber 102 that sent the first request using the first IP protocol, which was authenticated through the logon. Thus, a second logon is not provided.

After determining that the sender of the second request (i.e. the subscriber 102) is authenticated, the web portal 110 may be configured to send a message to the gateway 108 indicating that the subscriber 102 is authenticated. The message may include the ID associated with the other IP protocol, which the gateway 108 may record and/or use for subsequent requests sent by the subscriber 102. In one example, the message may include the second request. Where the second request includes a request for information, such as a website, webpage, or image, the gateway 108 may be configured to send the requested information to the subscriber 102 upon receiving the message from the web portal 110 that the subscriber 102 is authenticated.

As previously described, the subscriber ID may provide an identification for the subscriber 102 that is additional to the ID associated with the first IP protocol and the ID associated with the second IP protocol, and/or that may uniquely identify the subscriber 102. In some configurations, the subscriber ID may not be or include information that, on its face, identifies the subscriber 102. That is, the subscriber ID may generally be any information that may be used to correlate the ID associated with the first IP protocol with the ID associated with the second IP protocol. The subscriber ID may be any information that may be used, such as through a comparison, by the web portal 110 or gateway 108 to determine that the subscriber 102 sending the second request using the second IP protocol is the same subscriber 102 that sent the first request using the first IP protocol without having to request a second logon.

In some example configurations, the link generated by the web portal 110 may also include a key. The key may be a changing and/or a dynamic value. In one example, the value of the key may change every time the web portal 110 generates a link for a particular subscriber ID. The key may be used for security to prevent an unknown third party from being authenticated as the subscriber 102. If, for example the third party obtains the subscriber ID, then without using the key in the link, the third party may become authenticated by sending a request using only the subscriber ID. When generating the link, the web portal 110 may be configured to include the key. In the first configuration, the gateway 108 may be configured to record both the subscriber ID and the key. Upon activation of the link, the gateway 108 may be configured to receive a second request that includes both the subscriber ID and the key. The gateway 108 may compare the subscriber ID and the key included in the second request with the subscriber ID and the key that the gateway 108 recorded. If both the subscriber ID and the key match, then the gateway 108 may determine that the subscriber 102 is authenticated. Similarly, in the second configuration, the web portal 110 may be configured to record both the subscriber ID and the key. Upon activation of the link, the web portal 110 may be configured to receive a second request that includes both the subscriber ID and the key. The web portal 110 may compare the subscriber ID and the key included in the second request with the subscriber ID and the key that the web portal 110 recorded. If both the subscriber ID and the key match, then the web portal 110 may determine that the subscriber 102 is authenticated.

Where the link is a URL link, the key may be included as a second name/value pair in a query string. An example URL link that includes the key may be:

http://ipv4.portal.isp.com:8085/web-logonsuccessfulipv4support.html?subscriber_id=Bob&key=28432y23, where the first name/value pair is "subscriber_id" and "Bob" and the second name/value pair is "key" and "28432y23." Other keys and/or name/value pairs may be used.

In another alternative example configuration of the system 100, instead of sending a link capable of being activated, a cookie (e.g., a HTTP cookie, web cookie, or browser cookie), may be sent from either the gateway 108 or the web portal 110 to the subscriber 102 in response to determining that the subscriber 102 is authenticated using the first IP protocol. For example, where the web portal 110 determines that the subscriber 102 is authenticated based on the logon response received from the subscriber 102 a cookie, may be sent to the subscriber 102. The message may include the subscriber ID. The gateway 108 and/or the web portal 110 may be configured to record, such as by storing, the subscriber ID. In response to receiving the message, the subscriber 102 may be configured to record the cookie, such as in memory. In a subsequent request for information, such as a request using the second IP protocol, the request may include the cookie, or at least the subscriber ID that was included in the cookie. The gateway 108 and/or the web portal 110 may use the subscriber ID included in the subsequent request to determine whether the subscriber 102 is authenticated. In this way, the cookie functions as a correlation point that correlates the ID associated with the first IP protocol and the ID associated with the second IP protocol. By using the cookie as the correlation point, the gateway 108 and/or the web portal 110 may identify the subscriber 102 sending the first request and the subscriber 102 sending the subsequent request as the same subscriber using a single logon request.

As previously described, after the web portal 110 determines that the subscriber 102 is authenticated using the first IP protocol based on the logon information, the web portal 110 may provide the subscriber 102, via the gateway 108, with a first message that includes the link. The first message may be a webpage that is displayed by the subscriber's browser 106. In addition, as previously described, after the gateway 108 and/or the web portal 110 determines that the subscriber 102 is authenticated using the second IP protocol based on a comparison of the subscriber IDs, the web portal 110 and/or gateway 108 may provide the subscriber 102 with a second message. The second message may also be a webpage that is displayed by the subscriber's browser 106. In one configuration, the first message displayed after the first authentication determination and the second message displayed after the second authentication may be similar. In one example, the first message and the second message are the same. In another example, the first message and the second message are the same, except that the first message includes the link, and one of the messages includes an indicator that indicates a status of the authentication of the subscriber 102. The indicator may be an image, such as a Joint Photographic Experts Group (JPEG) image, that is included in the message. Where the message is a webpage, the indicator may be a JPEG image included in the webpage. In one example, the image may be present in the first message but not in the second, or vice versa. For example, the image may include a message such as "First IP Protocol enabled," or "Second IP Protocol not enabled." When the second message is displayed, the link may no longer be available to be activated, and/or the image may no longer be displayed. Alternatively, a different image may be displayed, such as "Second IP Protocol enabled." By configuring the first and second messages to be similar, a smooth or seamless transition between authenticating the subscriber 102 for only the first IP protocol and authenticating the subscriber 102 for both the first and the second IP protocols may be experienced.

Figure 2:
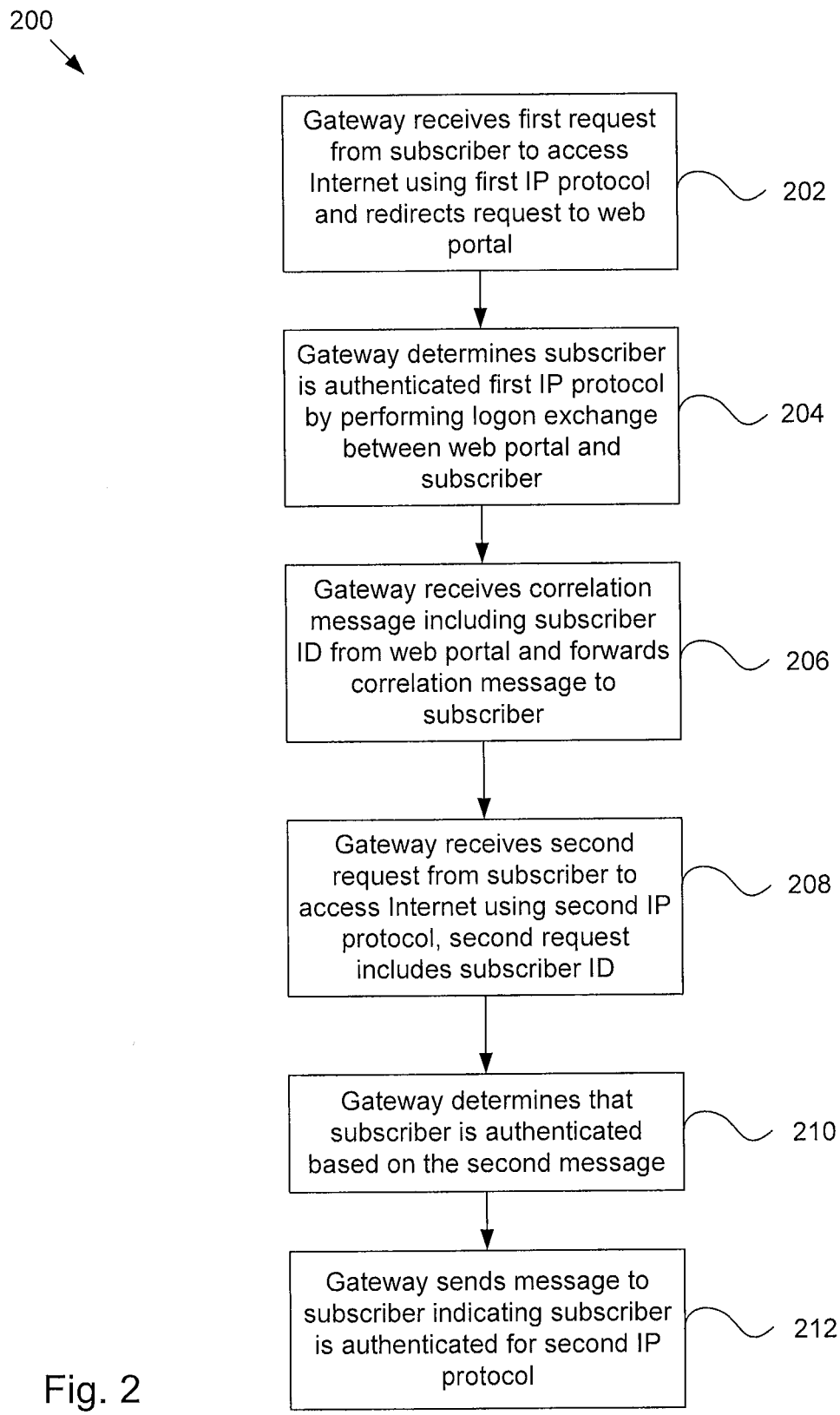
FIG. 2 illustrates a flow chart of an example method that may be used to authenticate a subscriber for multiple IP protocols with a single logon.

FIG. 2 shows a flow chart of an example method 200 that may be used to authenticate a subscriber for two IP protocols using a single logon. At block 202, a gateway may receive a request to access the Internet using a first IP protocol. Also, at block 202, the gateway may redirect the request to a web portal for authentication. At block 204, in response to redirecting the request to the web portal, the gateway may perform a logon exchange between the web portal and the subscriber to authenticate the subscriber for a first IP protocol. The gateway may perform the logon exchange by receiving a logon request from the web portal. The logon request may be sent in response to receiving the request to access the Internet using the first IP protocol. The gateway may further perform the logon exchange by forwarding the logon request to the subscriber. The gateway may receive a logon response from the subscriber and may forward the logon response to the web portal. Based on the logon exchange, the web portal may determine that the subscriber is authenticated to access the Internet using the first IP protocol.

At block 206, the gateway may receive a correlation message from the web portal that includes a subscriber ID. In one example, the correlation message is a link that causes the subscriber to generate a second request to access the Internet using a second IP protocol. The link may cause the subscriber to generate the second request when the link is activated. In another example, the correlation message is a cookie that includes the subscriber ID. The cookie may be sent to the subscriber, and the subscriber may store the cookie. When generating a request to access the internet using the second IP protocol, the cookie, or at least the subscriber ID included in the cookie, may be included in the second request to access the Internet using the second IP protocol. At block 208, the gateway may receive the second request that includes the subscriber ID.

At block 210, the gateway may determine that the subscriber sending the second request to access the Internet using the second IP protocol is the same as the subscriber that sent the first request using the first IP protocol, and is therefore authenticated. The determination may be made using the received second request. In one example, the gateway may identify the subscriber ID included in the second request and compare it to the subscriber ID that it received by the web portal. In another example, the gateway may forward the second request to the web portal, and the web portal may make the determination by comparing the subscriber ID included in the second request with the subscriber ID that the web portal included in the correlation message. The web portal may then send a message to the gateway that indicates the web portal's determination. The gateway may determine that the subscriber is authenticated based on the message received from the web portal. At block 212, the gateway may send a message to the subscriber indicating that the subscriber is authenticated to access the Internet. In one example, the message may be in the form of a webpage that enables the subscriber to make subsequent requests and/or receive subsequent information from over the Internet.

Figure 3:
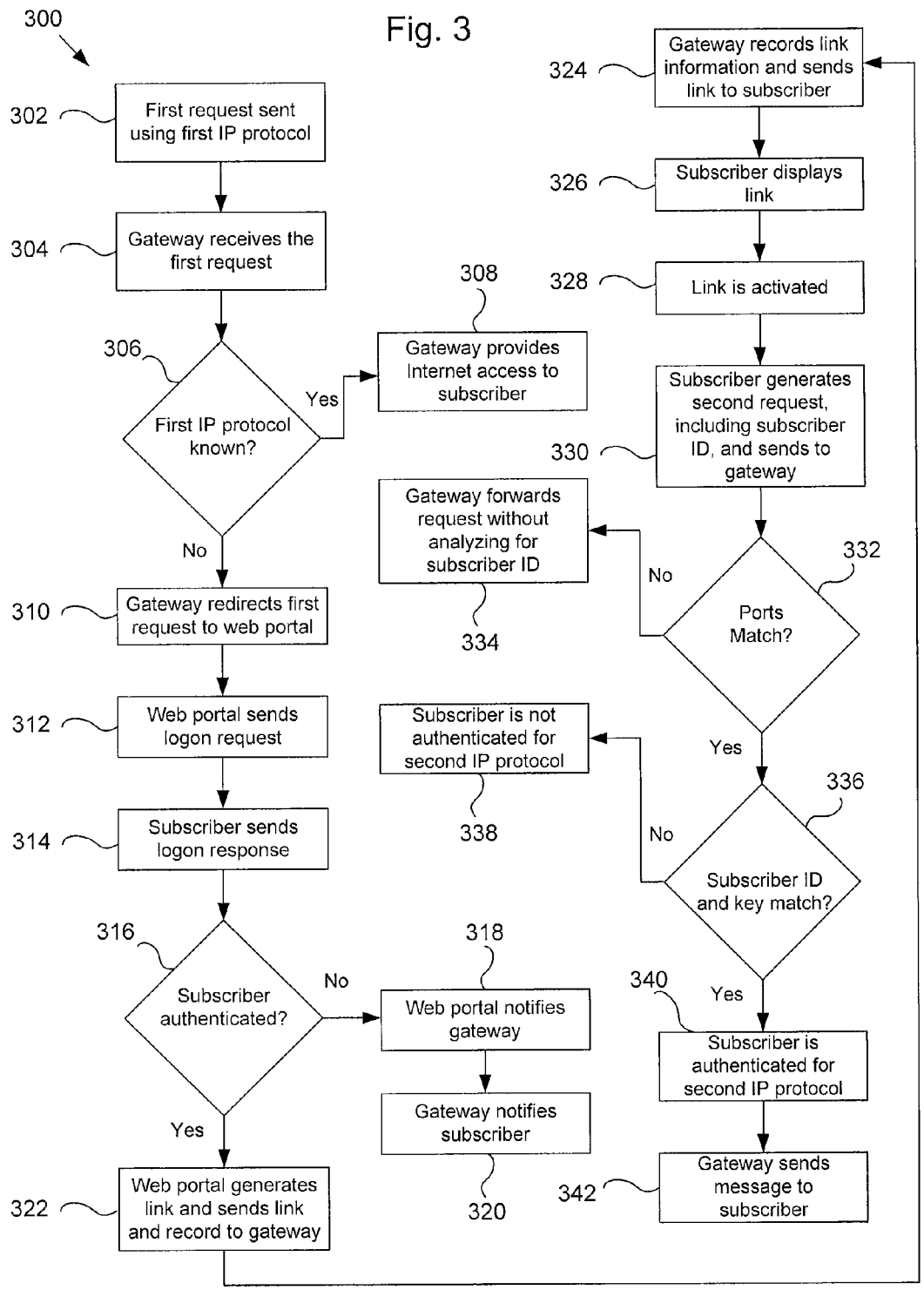
FIG. 3 illustrates a flow chart of a second example method that may be used to authenticate a subscriber for multiple IP protocols with a single logon.

FIG. 3 shows a flow chart of another example method 300 that may be used to authenticate a subscriber for two IP protocols using a single logon. At block 302, a subscriber may send a request to access the Internet using a first IP protocol.

The request may be made using a web browser of the subscriber, as previously described. Also, the request to access the Internet may be a request to receive and/or access information, such as a webpage or a website, from over the Internet. At block 304, a gateway may receive the request. At block 306, the gateway may determine whether the subscriber that sent the request is authenticated to access the Internet and/or receive the requested information. In one example, the gateway may determine whether an ID associated with the first IP protocol (such as an IP address) is known to the gateway.

At block 306, if the gateway determines that the ID associated with the first IP protocol is known, then at block 308, the gateway may provide access to the subscriber, such as by sending the requested webpage or website to the subscriber. However, if at block 306, the gateway determines that the ID associated with the first IP protocol is not known, then at block 310, the gateway may redirect the first request to a web portal.

At block 312, the web portal may receive the request and send, via the gateway, a log on request to the subscriber. At block 314, the subscriber may send a logon response, via the gateway, to the web portal. The logon response may include logon information, such as a username and password, as previously described. At block 316, the web portal may receive the logon response and determine whether to authenticate the subscriber based on the logon response. If the web portal determines not to authenticate the subscriber, then at block 318, the web portal may send a message to the gateway that the subscriber is not authenticated. At block 320, in response to receiving the message, the gateway may send a message to the subscriber that the subscriber is not authenticated to access the Internet and/or receive the requested information. Alternatively, if at block 316, the web portal determines to authenticate the subscriber based on the logon response, then at block 322 the web portal may generate a link, such as a URL link, that includes a subscriber ID. The link may also include a key, as previously described. The web portal may also generate a message, such as a webpage, that may include the link. Also, at block 322, the web portal may send the message, including the link and the key, to the gateway. In addition, at block 322, the web portal may send, via the gateway, a record to a DNS associated with the subscriber. The record may be used to map a domain name included in the link, to a destination IP address of information being requested in the second request.

At block 324, the gateway may receive the message, including the link, and record information in the link, including the subscriber ID and/or the key. Also, at block 324, the gateway may send the message, including the link, to the subscriber. At block 326, the subscriber may receive the message and the link and display, such as through a web browser, the message, which may or may not include displaying the link. At block 328, the link may be activated, such as by the web browser automatically activating the link in response to receipt of the message or by receiving an input to activate the link from an input device in communication with the web browser. At block 330, upon being activated, the subscriber may generate a second request to access the Internet. The second request may include the subscriber ID. The second request may also include the key. Generating the second request may also include translating the domain name using the DNS and the record received by the DNS to the corresponding destination IP address. The corresponding destination IP address may be included in the second request. The second request may also include a port number on which the requested information may be received. In some configurations, the second request may be formatted as a packet having a first portion and a second portion, such as a header a data field. The destination and source addresses and port number may be included in the header, and the subscriber ID and/or the key may be included in the data field. The generated second request may be sent from the subscriber to the gateway.

At block 332, the gateway may receive the second request and compare a port number in the second response with the port number that the gateway recorded to determine if the port numbers match. At block 334, if the port numbers do not match, then the gateway may forward the second request in accordance with the header information without analyzing the contents of the second request for the subscriber ID and/or the key. Alternatively, if the port numbers do match, then at block 336, the gateway may identify the subscriber ID and the key and determine if they match the recorded subscriber ID and key. In one example, the gateway may make the determination by performing a deep packet analysis on the second request, as previously described. If the subscriber ID and key do not match, then at block 338, the gateway may determine that the subscriber is not authenticated to access the Internet using the second IP protocol. At block 338, the gateway may also send the subscriber a message indicating that the subscriber is not authenticated. Alternatively, if the subscriber ID and key match, then at block 340, the gateway determines that the subscriber is authenticated to access the Internet using the second IP protocol. At block 342, the gateway may send a message to the subscriber indicating that the subscriber is authenticated to access the Internet using the second IP protocol.

Figure 4:
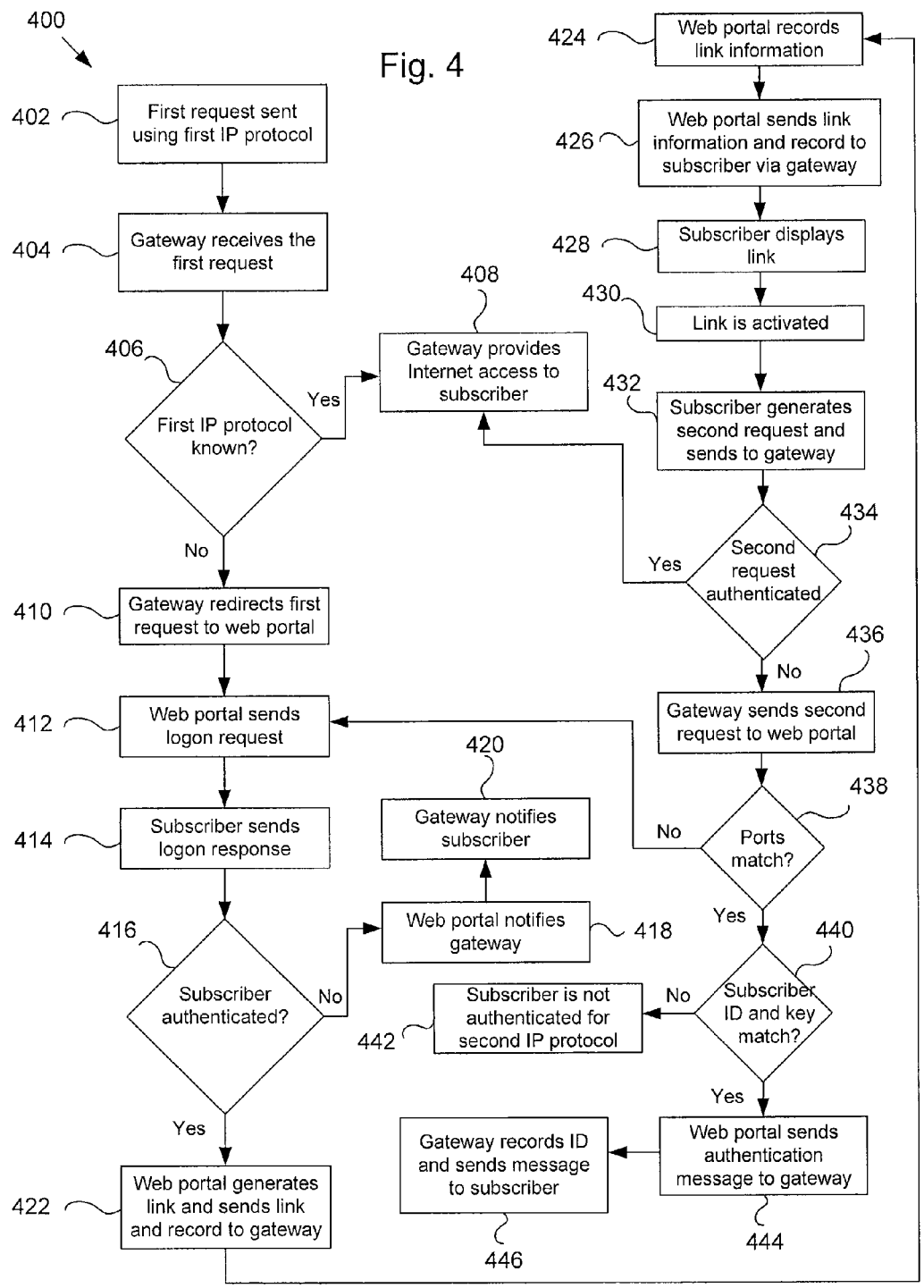
FIG. 4 illustrates a flow chart of a third example method that may be used to authenticate a subscriber for multiple IP protocols with a single logon.

FIG. 4 shows a flow chart of another example method 400 that may be used to authenticate a subscriber for two IP protocols using a single logon. At block 402, a subscriber may send a request to access the Internet using a first IP protocol. The request may be made using a web browser of the subscriber, as previously described. Also, the request to access the Internet may be a request to receive and/or access information, such as a webpage or a website, from over the Internet. At block 404, a gateway may receive the request. At block 406, the gateway may determine whether the subscriber that sent the request is authenticated to access the Internet and/or receive the requested information. In one example, the gateway may determine whether an ID associated with the first IP protocol (such as an IP address) is known to the gateway.

At block 406, if the gateway determines that the ID associated with the first IP protocol is known, then at block 408, the gateway may provide access to the subscriber, such as by sending the requested webpage or website to the subscriber. However, if at block 406, the gateway determines that the ID associated with the first IP protocol is not known, then at block 410, the gateway may redirect the first request to a web portal.

At block 412, the web portal may receive the request and send, via the gateway, a logon request to the subscriber. At block 414, the subscriber may send a logon response, via the gateway, to the web portal. The logon response may include logon information, such as a username and password, as previously described. At block 416, the web portal may receive the logon response and determine whether to authenticate the subscriber based on the logon response. If the web portal determines not to authenticate the subscriber, then at block 418, the web portal may send a message to the gateway that the subscriber is not authenticated. At block 420, in response to receiving the message, the gateway may send a message to the subscriber that the subscriber is not authenticated to access the Internet and/or receive the requested information. Alternatively, if at block 416, the web portal determines to authenticate the subscriber based on the logon response, then at block 422 the web portal generates a link, such as a URL link, that includes a subscriber ID. The link may also include a key, as previously described. The web portal may also generate a message, such as a webpage, that may include the link. At block 424, the web portal may record the subscriber ID. The web portal may also record the key. Also, at block 424, the web portal may record a port number that was included in the link. Also, at block 426, the web portal may send the message, including the link, to the subscriber via the gateway. In addition, at block 426, the web portal may send, via the gateway, a record to a DNS associated with the subscriber. The record may be used to map a domain name included in the link, to a destination IP address of information being requested in the second request.

At block 428, the subscriber may receive the message and the link. Also, at block 428, the subscriber may display the message and/or the link, such as through a web browser and/or using a display unit of a computer system, such as the display unit 610 of the computer system 600 shown in FIG. 6. At block 430, the subscriber may activate the link, such as by automatically activating the link in response to receipt of the message or by receiving a user input through an input device of a computer system, such as the input device 612 of the computer system 600 shown in FIG. 6. At block 432, upon being activated, the subscriber may generate a second request to access the Internet using the second IP protocol, as previously described. In addition, at block 432, the subscriber may send the second request to the gateway using the second IP protocol.

At block 434, the gateway may receive the second request and determine whether the sender of the second request (i.e., the subscriber) is authenticated. The subscriber may make the determination by identifying an ID (e.g. the source IP address) associated with the second IP protocol and by determining whether the ID is known. If the ID associated with the second protocol is known, then the gateway may determine that the subscriber is authenticated and the method may proceed back to block 408, where the gateway may provide access to the Internet.

Alternatively, if at block 434 the gateway determines that the sender of the second request is unknown, then at block 436, the gateway may forward the second request to the web portal. At block 438, the web portal may compare a port number in the second response with the port number that the web portal recorded and determine whether the port numbers match. If the port numbers do not match, then the method may proceed back to block 412, where the web portal may receive the request and send, via the gateway, a log on request to the subscriber. Alternatively, if the port numbers match, then at block 440, the web portal may identify the subscriber ID and key and determine if they match the recorded subscriber ID and key. If they do not match, then at block 442, the web portal may determine that the subscriber is not authenticated to access the Internet using the second IP protocol. At block 442, the gateway may also send the subscriber a message indicating that the subscriber is not authenticated.

Alternatively, if the subscriber ID and key match, then at block 444, the web portal determines that the subscriber that sent the second request using the second IP protocol is the same subscriber that sent the initial request using the first IP protocol, and is therefore authenticated to access the Internet using the second IP protocol. Also, at block 444, the web portal may send a message to the gateway indicating that the subscriber is authenticated to access the Internet using the second IP protocol. The message may include the ID (e.g., the source IP address) associated with the second IP protocol of the subscriber. At block 446, the gateway may forward the message to the subscriber. Also, at block 446, the gateway may record the ID associated with the second IP protocol so that the gateway knows that the subscriber is authenticated to access the Internet without having to provide another logon.

Figure 5:
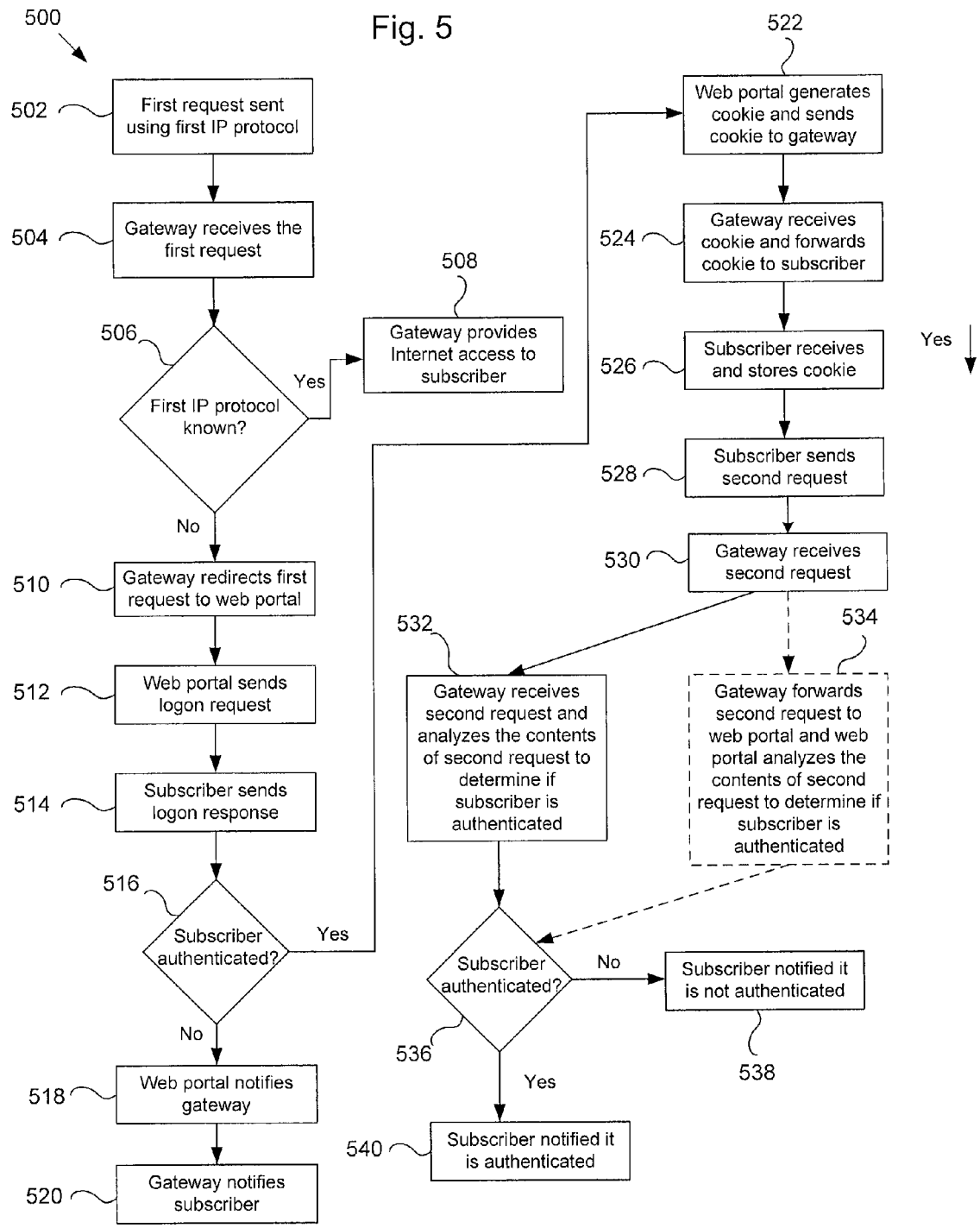
FIG. 5 illustrates a flow chart of a fourth example method that may be used to authenticate a subscriber for multiple IP protocols with a single logon.

FIG. 5 shows a flow chart of another example method 500 that may be used to authenticate a subscriber for two IP protocols using a single logon. At block 502, a subscriber may send a request to access the Internet using a first IP protocol. The request may be made using a web browser of the subscriber, as previously described. Also, the request to access the Internet may be a request to receive and/or access information, such as a webpage or a website, from over the Internet. At block 504, a gateway may receive the request. At block 506, the gateway may determine whether the subscriber that sent the request is authenticated to access the Internet and/or receive the requested information. In one example, the gateway may determine whether an ID associated with the first IP protocol (such as an IP address) is known to the gateway.

At block 506, if the gateway determines that the ID associated with the first IP protocol is known, then at block 508, the gateway may provide access to the subscriber, such as by sending the requested webpage or website to the subscriber. However, if at block 506, the gateway determines that the ID associated with the first IP protocol is not known, then at block 510, the gateway may redirect the first request to a web portal.

At block 512, the web portal may receive the request and send, via the gateway, a log on request to the subscriber. At block 514, the subscriber may send a logon response, via the gateway, to the web portal. The logon response may include logon information, such as a username and password, as previously described. At block 516, the web portal may receive the logon response and determine whether to authenticate the subscriber based on the logon response. If the web portal determines not to authenticate the subscriber, then at block 518, the web portal may send a message to the gateway that the subscriber is not authenticated. At block 520, in response to receiving the message, the gateway may send a message to the subscriber that the subscriber is not authenticated to access the Internet and/or receive the requested information.

Alternatively, if at block 516, the web portal determines to authenticate the subscriber based on the logon response, then at block 522 the web portal may generate a cookie that includes a subscriber ID. The cookie may also include a key. In one configuration, at block 522, the web portal may record the subscriber ID and the key for a later comparison, and then send the message and the cookie to the gateway. In another configuration, the web portal may send the message and the cookie without recording the subscriber ID and the key. Also, at block 522, the web portal may send the message and the cookie to the gateway.

At block 524, the gateway may receive the message. In one configuration, the gateway may record the subscriber ID and key included in the cookie, and then send the message and the cookie to the subscriber. In another configuration, then gateway may send the message and the cookie to the subscriber without recording the subscriber and the key.

At block 526, the subscriber may receive the message and the cookie. Also, at block 526, the subscriber may display, such as through a web browser, the message. At block 528, the subscriber may send a second request to access the Internet. The second request may include a request to access content over the Internet that is accessible via a second IP protocol. The second request may also include the cookie, or at least the subscriber ID and key included in the cookie. At block 530, the gateway may receive the cookie. In one configuration (as indicated by the solid lines), at block 532, the gateway may be configured to determine if the subscriber ID and key included in the second message match the subscriber ID and key that the gateway recorded. In an alternative configuration (indicated by the dotted lines), at block 534, the gateway may forward the second request to the web portal, and the web portal may determine whether the subscriber ID and key included in the second message match the subscriber ID and key that the web portal recorded. After the analysis performed at either block 532 or block 534, and a determination is made at block 536 whether the subscriber is authenticated, at block 538, if the subscriber is not authenticated, then a message is sent to the subscriber indicating that the subscriber is not authenticated to access the Internet and/or receive the requested information from over the Internet using the second IP protocol. Alternatively, if the subscriber is authenticated, then at block 540, a message may be sent to the subscriber indicating that the subscriber is authenticated to access the Internet and/or receive the requested information from over the Internet using the second IP protocol.

The components of the system 100, including the gateway, the subscriber, and/or the web portal shown in FIG. 1 may be and/or may include a portion or all of one or more computing devices of various kinds, such as the computing device in FIG. 6. FIG. 6 illustrates an example of a general computer system designated 600. Any of the components from the system 100 shown in FIG. 1 may include a portion or all of the computer system 600. For example, in some examples, the computer system 600 may include only a processor and memory. The computer system 600 can include a set of instructions that can be executed to cause the computer system 600 to perform any one or more of the methods or computer based functions disclosed. The computer system 600 may operate as a standalone device or may be connected, e.g., using a network, to other computer systems or peripheral devices.

In a networked deployment, the computer system 600 may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular example, the computer system 600 can be implemented using electronic devices that provide voice, audio, video or data communication. Further, while a single computer system 600 is illustrated, the term "system" shall also be taken to include any collection of systems or sub-systems that individually or jointly execute a set, or multiple sets, of instructions to perform one or more computer functions.

In FIG. 6, the example computer system 600 may include a processor 602, e.g., a central processing unit (CPU), a graphics processing unit (GPU), or both. The processor 602 may be a component in a variety of systems. For example, the processor 602 may be part of a standard personal computer or a workstation. The processor 602 may be one or more general processors, digital signal processors, application specific integrated circuits, field programmable gate arrays, servers, networks, digital circuits, analog circuits, combinations thereof, or other now known or later developed devices for analyzing and processing data. The processor 602 may implement a software program, such as code generated manually (i.e., programmed).

The term "module" may be defined to include a plurality of executable modules. As described herein, the modules are defined to include software, hardware or some combination thereof executable by a processor, such as processor 602. Software modules may include instructions stored in memory, such as memory 604, or another memory device, that are executable by the processor 602 or other processor. Hardware modules may include various devices, components, circuits, gates, circuit boards, and the like that are executable, directed, and/or controlled for performance by the processor 602.

The computer system 600 may include a memory 604, such as a memory 604 that can communicate via a bus 608. The memory 604 may be a main memory, a static memory, or a dynamic memory. The memory 604 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 604 includes a cache or random access memory for the processor 602. In alternative examples, the memory 604 is separate from the processor 602, such as a cache memory of a processor, the system memory, or other memory. The memory 604 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 604 is operable to store instructions executable by the processor 602. The functions, acts or tasks illustrated in the figures or described may be performed by the programmed processor 602 executing the instructions stored in the memory 604. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 600 may or may not further include a display unit 610, such as a liquid crystal display (LCD), an organic light emitting diode (OLED), a flat panel display, a solid state display, a cathode ray tube (CRT), a projector, a printer or other now known or later developed display device for outputting determined information. The display 610 may act as an interface for the user to see the functioning of the processor 602, or specifically as an interface with the software stored in the memory 604 or in the drive unit 616.

Additionally, the computer system 600 may include an input device 612 configured to allow a user to interact with any of the components of system 600. The input device 612 may be a number pad, a keyboard, or a cursor control device, such as a mouse, or a joystick, touch screen display, remote control or any other device operative to interact with the computer system 600.

In a particular example, as depicted in FIG. 6, the computer system 600 may also include a disk or optical drive unit 616. The disk drive unit 616 may include a computer-readable medium 622 in which one or more sets of instructions 624, e.g. software, can be embedded. Further, the instructions 624 may embody one or more of the methods or logic as described. In a particular example, the instructions 624 may reside completely, or at least partially, within the memory 604 and/or within the processor 602 during execution by the computer system 600. The memory 604 and the processor 602 also may include computer-readable media as discussed above.

The present disclosure contemplates a computer-readable medium that includes instructions 624 or receives and executes instructions 624 responsive to a propagated signal so that a device connected to a network 626 can communicate voice, video, audio, images or any other data over the network 626. Further, the instructions 624 may be transmitted or received over the network 626 via a communication port or interface 620, and/or using a bus 608. The communication port or interface 620 may be a part of the processor 602 or may be a separate component. The communication port 620 may be created in software or may be a physical connection in hardware. The communication port 620 may be configured to connect with a network 626, external media, the display 610, or any other components in system 600, or combinations thereof. The connection with the network 626 may be a physical connection, such as a wired Ethernet connection or may be established wirelessly as discussed later. Likewise, the additional connections with other components of the system 600 may be physical connections or may be established wirelessly. The network 626 may alternatively be directly connected to the bus 608.

The network 626 may include wired networks, wireless networks, or combinations thereof. The wireless network may be a cellular telephone network, an 802.11, 802.16, 802.20, 802.1Q or WiMax network. Further, the network 626 may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed. The "computer-readable medium" may be non-transitory, and may be tangible.

In an example, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative example, dedicated hardware implementations, such as application specific integrated circuits, programmable logic arrays and other hardware devices, can be constructed to implement various modules or parts of modules included in the system. Applications that may include the apparatus and systems can broadly include a variety of electronic and computer systems. One or more examples described may implement functions using two or more specific interconnected hardware modules or devices with related control and data signals that can be communicated between and through the modules, or as portions of an application-specific integrated circuit. Accordingly, the present system encompasses software, firmware, and hardware implementations.

The system described may be implemented by software programs executable by a computer system. Further, in a non-limited example, implementations can include distributed processing, component/object distributed processing, and parallel processing. Alternatively, virtual computer system processing, such as cloud computing, can be constructed to implement various parts of the system.

The system is not limited to operation with any particular standards and protocols. For example, standards for Internet and other packet switched network transmission (e.g., TCP/IP, UDP/IP, HTML, HTTP) may be used. Such standards are periodically superseded by faster or more efficient equivalents having essentially the same functions. Accordingly, replacement standards and protocols having the same or similar functions as those disclosed are considered equivalents thereof.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. An apparatus comprising:
a memory; and
at least one processor circuit in communication with the memory, the at least one processor configured to:
store a first subscriber identification of a subscriber in the memory, the subscriber identification being stored in response to a first logon exchange with the subscriber that identifies that the subscriber is authenticated to access the Internet using a first source Internet Protocol address of the subscriber, the first source Internet Protocol address formatted in accordance with a first version of the Internet Protocol;
send a link to the subscriber in response to a determination that the subscriber is authenticated to access the Internet using the first source Internet Protocol address, wherein the link comprises a resource that is accessible via a second version of the Internet Protocol and a second subscriber identification of the subscriber, wherein the link, upon being activated, causes the subscriber to generate a request to access the Internet using a second source Internet Protocol address of the subscriber, the second source Internet Protocol address formatted in accordance with the second version of the Internet Protocol, and wherein the request includes the second source Internet Protocol address and the second subscriber identification of the subscriber;
receive, from the subscriber, the request to access the Internet using the second source Internet Protocol address of the subscriber;
compare the second subscriber identification included in the request with the stored first subscriber identification; and determine that the subscriber is authenticated to access the Internet using the second source Internet Protocol address based on the comparison.

2. The apparatus of claim 1, wherein the request comprises a second request, wherein the at least one processor circuit is further configured to:
perform the first logon exchange in response to a first request to access the Internet made by the subscriber using the first source Internet Protocol address of the subscriber.

3. The apparatus of claim 1, wherein the link further comprises a first port number of a destination port on which the resource is to be received,
wherein the at least one processor circuit is further configured to:
determine whether a second port number included in the request matches the first port number; and
compare the second subscriber identification with the first subscriber identification in response to determination that the second port number matches the first port number.

4. The apparatus of claim 1, wherein the link further comprises a dynamic key.

5. The apparatus of claim 1, wherein the at least one processor circuit is further configured to:
send the link to the subscriber as a Universal Resource Locator (URL) link embedded in a webpage.

6. A method comprising:
receiving, with at least one processor circuit, a first request to access the Internet using a first source Internet Protocol address from a subscriber, the first source Internet Protocol address being formatted in accordance with a first version of the Internet Protocol;
in response to receiving the first request, performing, with the least one processor circuit, a first logon exchange with the subscriber that identifies that the subscriber is authenticated to access the Internet using the first source Internet Protocol address;
identifying, with the at least one processor circuit, a first subscriber identification of the subscriber in response to the first logon exchange identifying the subscriber as being authenticated to access the Internet using the first source Internet Protocol address;
sending, with the at least one processor circuit, a link to the subscriber in response to the first logon exchange identifying that the subscriber is authenticated to access the Internet using the first source Internet Protocol address, wherein the link comprises a resource that is accessible via a second version of the Internet Protocol and a second subscriber identification of the subscriber, wherein the link, upon being activated, causes the subscriber to generate a second request to access the Internet using a second source Internet Protocol address of the subscriber, the second source Internet Protocol address formatted in accordance with the second version of the Internet Protocol, wherein the second request includes the second source Internet Protocol address and the second subscriber identification of the subscriber;
receiving, with the at least one processor circuit, the second request to access the Internet using a second source Internet Protocol address from the subscriber;
comparing, with the at least one processor circuit, the second subscriber identification included in the second request with the first subscriber identification; and
determining, with the at least one processor circuit, that the subscriber is authenticated to access the Internet using the second source Internet Protocol address based on comparing the second subscriber identification with the first subscriber identification.

7. The method of claim 6, wherein performing the first logon exchange comprises:
sending, with the at least one processor circuit, a logon request to the subscriber in response to receiving the first request; and
receiving, with the at least one processor circuit, logon information from the subscriber in response to the logon request.

8. The method of claim 6, wherein the link further comprises a first port number of a destination port on which the resource is to be received, wherein the method further comprises:
determining, with the at least one processor circuit, whether a second port number included in the second request matches the first port number; and
wherein comparing the second subscriber identification included in the second request with the first subscriber identification comprises comparing, with the at least one processor circuit, the second subscriber identification with the first subscriber identification in response to determining that the second port number matches the first port number.

9. The method of claim 6,
wherein sending the link to the subscriber comprises sending, with the at least one processor circuit, a Universal Resource Locator (URL) link embedded in a webpage.

10. One or more non-transitory computer readable tangible storage media encoded with software comprising computer executable instructions that when executed:
store a first subscriber identification of a subscriber in a memory, the first subscriber identification being stored in response to a logon exchange with the subscriber that identifies that the subscriber is authenticated to access the Internet using a first source Internet Protocol address of the subscriber, wherein the first source Internet Protocol address is formatted in accordance with a first version of the Internet Protocol;
send a link to the subscriber in response to the subscriber being authenticated to access the Internet using the first source Internet Protocol address, wherein the link comprises a resource that is accessible via a second version of the Internet Protocol and a second subscriber identification of the subscriber, wherein the link, upon being activated, causes the subscriber to generate a request to access the Internet using a second source Internet Protocol address of the subscriber, the second source Internet Protocol address formatted in accordance with the second version of the Internet Protocol, wherein the second request includes the second source Internet Protocol address and the second subscriber identification of the subscriber;
receive the request to access the Internet from the subscriber using the second source Internet Protocol address of the subscriber;
compare the second subscriber identification included in the request with the stored first subscriber identification; and
determine that the subscriber is authenticated to access the Internet using the second source Internet Protocol address based on the comparison of the second subscriber identification with the first subscriber identification.

11. The one or more non-transitory computer readable tangible storage media of claim 10, wherein the request comprises a second request, and wherein the computer executable instruction that when executed further:

perform the logon exchange in response to a first request to access the Internet made by the subscriber using the first source Internet Protocol address.

12. The one or more non-transitory computer readable tangible storage media of claim 10, wherein the link further comprises a first port number of a destination port on which the resource is received, wherein the software, when executed, is further configured to:

determine whether a second port number included in the request matches the first port number; and compare the second subscriber identification with the first subscriber identification in response to determination that the second port number matches the first port number.

13. The apparatus of claim 1, wherein the at least one processor circuit is further configured to determine that the subscriber is authenticated to access the Internet using the second source Internet Protocol address without a second logon exchange with the subscriber, wherein the second logon exchange identifies that the subscriber is authenticated to access the Internet using the second source Internet Protocol address.

14. The method of claim 6, wherein authentication of the subscriber to access the Internet using the second source Internet Protocol address is determined without performing a second logon exchange with the subscriber, wherein the second logon exchange identifies that the subscriber is authenticated to access the Internet using the second source Internet Protocol address.

15. The one or more non-transitory computer readable tangible storage media of claim 10, wherein the computer executable instruction that when executed further determine that the subscriber is authenticated without a second logon exchange with the subscriber, wherein the second logon exchange identifies that the subscriber is authenticated to access the Internet using the second source Internet Protocol address.

* * * * *